US009266732B2

(12) United States Patent
Park et al.

(10) Patent No.: US 9,266,732 B2
(45) Date of Patent: *Feb. 23, 2016

(54) APPARATUS FOR A HYDROCARBON REFORMING USING A MICRO-CHANNEL HEATER

(75) Inventors: Jong-Soo Park, Daejeon (KR); Kyung-Ran Hwang, Daejeon (KR); Shin-Kun Ryi, Daejeon (KR); Chun-Boo Lee, Daejeon (KR); Sung-Wook Lee, Jeollanamdo (KR)

(73) Assignee: Korea Institute of Energy Research, Daejeon (KR)

( * ) Notice: Subject to any disclaimer, the term of this patent is extended or adjusted under 35 U.S.C. 154(b) by 148 days.

This patent is subject to a terminal disclaimer.

(21) Appl. No.: 14/116,676

(22) PCT Filed: Dec. 6, 2011

(86) PCT No.: PCT/KR2011/009392
§ 371 (c)(1),
(2), (4) Date: Jan. 7, 2014

(87) PCT Pub. No.: WO2012/153902
PCT Pub. Date: Nov. 15, 2012

(65) Prior Publication Data
US 2014/0301917 A1     Oct. 9, 2014

(30) Foreign Application Priority Data
May 9, 2011 (KR) .......................... 10-2011-0043542

(51) Int. Cl.
*B01J 19/00* (2006.01)
*C01B 3/38* (2006.01)
(Continued)

(52) U.S. Cl.
CPC ............. *C01B 3/382* (2013.01); *B01J 19/0093* (2013.01); *C01B 3/384* (2013.01);
(Continued)

(58) Field of Classification Search
CPC ........................................ B01J 19/0093; B01J 2219/00781–2219/00923; C01B 3/02; C01B 3/32–3/386; C01B 2203/02; C01B 2203/0205; C01B 2203/0227; C01B 2203/0233; C01B 2203/08–2203/0811; H01M 8/04; H01M 8/04007; H01M 8/04067; H01M 8/06–8/0612; H01M 8/0631
See application file for complete search history.

(56) References Cited

U.S. PATENT DOCUMENTS 6,171,574 B1    1/2001   Juda et al.
6,447,736 B1    9/2002   Autenrieth et al.
(Continued)

FOREIGN PATENT DOCUMENTS

CN          101040400        9/2007
EP          0308976 A1       3/1989
(Continued)

OTHER PUBLICATIONS

International Search Report directed to related International Patent Application No. PCT/KR2011/009392, mailed May 31, 2012, 2 pages.
(Continued)

*Primary Examiner* — Natasha Young
(74) *Attorney, Agent, or Firm* — Sterne, Kessler, Goldstein & Fox P.L.L.C.

(57) ABSTRACT

The present invention relates to an apparatus for reforming a hydrocarbon using a micro-channel heater, which can utilize the combustion heat of a fuel as an energy source needed for reforming a hydrocarbon. A plurality of thin metal plates having micro-channels may be laminated in a multilayered structure so as to manufacture a small to medium compact hydrogen-producing apparatus. In particular, a reforming unit may be designed to have a multilayered structure so as to improve the capacity of a reformer up to a level desired by a user.

8 Claims, 12 Drawing Sheets

(51) Int. Cl.
- *H01M 8/04* (2006.01)
- *H01M 8/06* (2006.01)
- *C01B 3/00* (2006.01)
- *C01B 3/02* (2006.01)
- *C01B 3/32* (2006.01)
- *C01B 3/34* (2006.01)
- *C01B 3/36* (2006.01)
- *H01M 8/00* (2006.01)

(52) U.S. Cl.
CPC ....... *H01M 8/04067* (2013.01); *H01M 8/0612* (2013.01); *H01M 8/0631* (2013.01); *B01J 2219/00783* (2013.01); *B01J 2219/00822* (2013.01); *B01J 2219/00835* (2013.01); *B01J 2219/00844* (2013.01); *B01J 2219/00873* (2013.01); *B01J 2219/00889* (2013.01); *C01B 2203/0233* (2013.01); *C01B 2203/0811* (2013.01); *Y02E 60/50* (2013.01)

(56) References Cited

U.S. PATENT DOCUMENTS

| | | | |
|---|---|---|---|
| 7,927,750 | B2 | 4/2011 | Park et al. |
| 2003/0027031 | A1* | 2/2003 | Baldauf et al. .................. 429/35 |
| 2008/0050634 | A1* | 2/2008 | Park et al. ........................ 429/34 |
| 2010/0058663 | A1 | 3/2010 | Son |
| 2014/0030156 | A1 | 1/2014 | Park et al. |
| 2014/0178259 | A1* | 6/2014 | Hwang et al. ................. 422/162 |

FOREIGN PATENT DOCUMENTS

| | | |
|---|---|---|
| EP | 1712274 A1 | 10/2006 |
| JP | 63-025201 | 2/1988 |
| JP | H 05319801 | 12/1993 |
| JP | H 11263601 | 9/1999 |
| JP | 2000-344503 | 12/2000 |
| JP | 2002-020104 | 1/2002 |
| JP | 2003-073105 | 3/2003 |
| JP | 2004-026526 | 1/2004 |
| JP | 2004261911 | 9/2004 |
| JP | 2008-518184 | 5/2008 |
| JP | 2010-59050 | 3/2010 |
| JP | 2013-528560 | 7/2013 |
| KR | 10-2006-0031935 A | 4/2006 |
| KR | 10-0599382 B1 | 7/2006 |
| KR | 2011-0092416 | 8/2011 |
| WO | WO 2006/109949 A1 | 10/2006 |
| WO | WO 2008/010672 A1 | 1/2008 |

OTHER PUBLICATIONS

Written Opinion of the International Searching Authority directed to related International Patent Application No. PCT/KR2011/009392, mailed May 31, 2012, 2 pages.

Supplementary European Search Report directed to related European Patent Application No. 11865439, mailed Oct. 29, 2014, 2 pages.

Grant of Patent directed to Related Korean Patent Application No. 10-2011-0043542, mailed May 16, 2013, 2 page.

Written Opinion directed to related Korean Patent Application No. 10-2011-0043542, mailed Jan. 22, 2013, 2 page.

European Search Opinion directed to Related European Patent Application No. 11865439, mailed Oct. 29, 2014, 3 pages.

Chinese Search Report directed to related Chinese Patent Application No. 201180070755.3, mailed Jan. 4, 2015, 1 page.

* cited by examiner

APPARATUS FOR A HYDROCARBON REFORMING USING A MICRO-CHANNEL HEATER

This application is a §371 U.S. National Stage Phase of PCT/KR2011/009392, now WO 2012/153902, filed 6 Dec. 2011 and claims priority to Korean Appl. No. 10-2011-0043542 filed 9 May 2011.

TECHNICAL FIELD

The present invention relates to an apparatus for hydrocarbon reforming using a micro-channel heater. More specifically, the present invention relates to an apparatus for hydrocarbon reforming using a micro-channel heater, in which thin metal plates having micro-channels are laminated to form a heat transfer unit and a reforming unit, and the reforming unit is designed to have a double layered structure, such that a user can expand the reforming capacity to a desired numerical value.

BACKGROUND ART

With the development of various industries, there is the possibility for an increase in a demand for an on-site or on-board miniature hydrogen manufacturing apparatus. A commercialized large-scale hydrogen manufacturing process is shown in FIG. That is, hydrocarbons are converted to synthetic gases containing hydrogen and carbon monoxide in a reformer 10, and water gas shift (WGS) is carried out in a carbon monoxide water gas shift reactor 20, and then, carbon monoxide is removed from the reformed gas in a hydrogen separator 30 using a catalyst or a separation membrane to generate hydrogen. In this regard, as heat of reaction ('reaction heat') needed in the reformer 10, heat of combustion ('combustion heat') generated by burning a part of hydrogen generated from the hydrogen separator 30 in a combustor 40 is used.

The hydrogen formation reaction using hydrocarbon can be preceded in many ways as shown reaction formulas of 1 to 3.

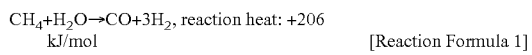
[Reaction Formula 1]

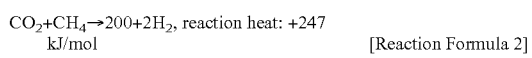
[Reaction Formula 2]

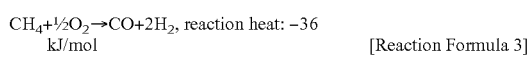
[Reaction Formula 3]

Of these formulas, steam reforming according to reaction formula 1, wherein the concentration of hydrogen in the products is the highest, is attracting attention.

A difficulty in this process is that supplying heat necessary for the reaction is crucial, as shown in reaction formula 1. Because it is possible to obtain 95% or more for the conversion rate of hydrocarbon (methane) at 750☐ or higher in the case of steam reforming, a great deal of effort is needed to supply reaction heat and maintain a high temperature.

The reaction heat necessary for the above reaction formula 1 is generated through combustion (catalytic oxidation or combustion) of hydrocarbon as in reaction formula 4.

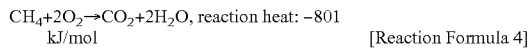
[Reaction Formula 4]

In order to make heat transfer effectively in the process of reaction formula 4, it is necessary to have a material having a high temperature difference (ΔT), a wide contact area (A), and a high heat transfer coefficient (k).

However, it is impossible to indefinitely raise a temperature of flame necessary for heating in order to obtain a desired temperature difference, and there is a problem of component materials, and also there is limitation in that the component materials have inherent heat transfer coefficients which are determined independently.

Therefore, the key controllable factor in the construction of the reactor is concluded to be the enlargement of the heat transfer area (A).

As a reactor for such a purpose as described above, there is an attempt to make use of a reactor having micro-channels on a thin metal plate. In particular, the present applicant has developed apparatuses in Korean Patent Registration No. 10-0719486 (Micro-combustion/reforming reactor) and Korean Patent Application No. 10-2009-0124091 (Hydrocarbon reforming apparatus using a micro-channel heater). The above patents disclose an invention in regard to a micro-combustion/reforming reactor with a specific module configuration, wherein a wide contact area per unit volume can be secured by laminating a plurality of processed thin metal plates in multilayer structure.

A combustion reaction of hydrocarbon (NG, LPG and alcohols) necessary for generation of reaction heat is an intensive reaction that generates a considerably high heat value, and can be carried out through either catalytic combustion or non-catalytic combustion.

The above catalytic oxidation has problems in that the catalytic bed should be preheated up to a specific temperature zone in which an oxidation reaction can proceed, and durability should be considered when exposed for a long time during coating the inside of the micro-channel. That is, it is difficult to maintain the oxidation activity of an oxidation catalyst when the oxidation catalyst is exposed to high heat throughout operation of a combustion apparatus, therefore, this difficulty acts as a limitation in putting this system to practical use. Further, since the non-catalytic combustion requires a space for an expanding ignition flame, it cannot be applied to a compact micro-channel reactor.

Various forms of hydrocarbon reforming catalyst have been put to practical use, and methods of coating a catalytic agent are disclosed in many patents and documents. However, in order to use the hydrocarbon reforming catalyst in a micro-channel reactor as in the present invention, a reactor must be constructed to be compatible with characteristics of the catalyst.

In particular, since the micro-channel reactor is used in a small space, an area in which the reformed gas can reliably contact is preferably widened as much as possible in a limited space, in order to obtain a maximum reforming efficiency. Accordingly, there is still a need for a solution to overcome the foregoing problem.

DISCLOSURE

Technical Problem

Accordingly, to solve the above-mentioned problems, it is an object of the present invention to provide an apparatus for hydrocarbon reforming using a micro-channel heater, in which thin metal plates having micro-channels are laminated to form a heat transfer unit and a reforming unit, and the reforming unit is designed to have a double layered structure, such that a user can expand the reforming capacity to a desired numerical value.

Technical Solution

The present invention is completed based on the idea that the hydrogen oxidation reaction, as shown in reaction formula 5, can be initiated on a surface of a noble metal catalyst at room temperature.

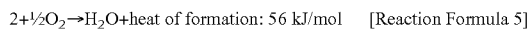

$2+\frac{1}{2}O_2 \rightarrow H_2O$+heat of formation: 56 kJ/mol  [Reaction Formula 5]

That is, the reactor can be operated in such a way that it is heated to a given temperature by using hydrogen at an early stage of reactor operation and methane is supplied to produce a main heat source. Alternatively, when using a mixture gas of hydrogen and other hydrocarbon from the early stage of reactor operation, it can be made to ignite at room temperature.

Because the reactor heating system can be simplified by using hydrogen having good ignitability alone or as a mixture with hydrocarbon, it is possible to strengthen the competitiveness of a compact reactor such as the micro-channel reactor.

In the present invention, synthetic gases are made from hydrocarbon using a nickel based catalyst. Hydrocarbon reforming characteristics of the nickel based catalyst are well known in the related art. In particular, the present invention provides a hydrocarbon reformer in which a nickel based porous plate-type catalyst is combined with the micro-channel reactor.

In addition, for ignition in a heating system, it is characterized in that ignition is initiated by directing a mixed gas of air and fuel to flow toward the part ignited by the catalyst or electric discharge, and flames are transferred to an initial mixing point of the fuel and air. Thus, degradation or loss of an ignition device is fundamentally excluded.

The present invention is characterized in that the above catalyst for reforming may be a porous plate made of metal powder. Further, a three-dimensional mixing plate is positioned above and below the catalyst plate so that hydrocarbon and moisture pass through the catalyst layer in a vertical direction. In this regard, by using the three-dimensional mixing plate, a binding force may be applied to a catalyst holder plate connected to the catalyst plate, a space for reactant flow may be provided therein, and the mixing plate is configured to play the role of energy transferring member from a heating plate to the catalyst plate.

In order to accomplish the foregoing objects, according to an embodiment of the present invention, there is provided an apparatus for hydrocarbon reforming using a micro-channel heater including: an upper plate including a heat transfer gas supply pipe which is connected with a heat transfer gas supply source to supply a heat transfer gas, and a reformed gas discharge pipe for discharging a reformed gas; a lower plate including a raw gas supply pipe which is connected with a raw gas supply source to supply a raw gas, and a heat transfer gas discharge pipe for discharging the heat transfer gas; an upper heat transfer unit which is disposed under the upper plate and includes an upper heat transfer gas flow path which is connected with the heat transfer gas supply pipe to flow the heat transfer gas, and an upper reformed gas flow path which is formed in contact with the upper heat transfer gas flow path so as to allow heat transfer therebetween, and connected with the reformed gas discharge pipe; a lower heat transfer unit which is disposed on the lower plate and includes a lower heat transfer gas flow path which is connected with the heat transfer gas discharge pipe to flow the heat transfer gas, and a lower reformed gas flow path which is formed in contact with the lower heat transfer gas flow path so as to allow heat transfer therebetween, and connected with the raw gas supply pipe; and at least one reforming units laminated between the upper heat transfer unit and the lower heat transfer unit, wherein the reforming unit, in order to be laminated two or more layers, includes: a gas supply plate on which a gas supply channel for communicating only with the lower reformed gas flow path is installed; a reforming catalyst plate which is laminated on the gas supply plate and has a reforming catalyst mounted thereon; a gas transfer unit which is laminated on the reforming catalyst plate to transfer the reformed gas by the reforming catalyst to the upper reformed gas flow path; and a heating plate which is disposed under the gas supply plate or on the lower gas transfer unit and has a heating channel for communicating the upper heat transfer gas flow path with the lower heat transfer gas flow path, and wherein the gas supply plate, the reforming catalyst plate, the gas transfer unit, and the heating plate include first reforming through holes communicated with the upper reformed gas flow path, second reforming through holes communicated with the upper heat transfer gas flow path, third reforming through holes communicated with the lower reformed gas flow path, fourth reforming through holes communicated with the lower heat transfer gas flow path, respectively.

Preferably, the upper heat transfer unit includes: at least one upper heat transfer plates which have an upper heat transfer channel communicated with the heat transfer gas supply pipe, and form the upper heat transfer gas flow path; and at least one upper reforming plates which have an upper reforming channel communicated with the reformed gas discharge pipe, and are alternately laminated with the upper heat transfer plate to form the upper reformed gas flow path, the upper heat transfer plates and the upper reforming plates include first to fourth upper through holes formed at a position corresponding to the first to fourth reforming through holes of the reforming unit, and an upper shielding plate having the first and second upper through holes formed therein is disposed at the lowermost side of the upper heat transfer unit.

Preferably, the lower heat transfer unit includes: at least one lower heat transfer plates which have a lower heat transfer channel communicated with the heat transfer gas supply pipe, and form the lower heat transfer gas flow path; and at least one lower reforming plates which have a lower reforming channel communicated with the raw gas supply pipe, and are alternately laminated with the lower heat transfer plate to form the lower reformed gas flow path, the lower heat transfer plates and the lower reforming plates include first to fourth lower through holes formed at a position corresponding to the first to fourth reforming through holes of the reforming unit, and a lower shielding plate having the third and fourth lower through holes formed therein is disposed at the uppermost side of the lower heat transfer unit.

Preferably, the gas transfer unit includes: a gas collection plate which is disposed on the reforming catalyst plate, and isolated from the first to fourth reforming through holes; and a gas transfer plate which is disposed on the gas collection plate, and includes a gas transfer channel communicated only with the first reforming through hole.

Preferably, the gas transfer unit is a collection and transfer plate which is disposed on the reforming catalyst plate, and has porous collection holes isolated from the second to fourth reforming through holes, wherein the porous collection holes are communicated with the first reforming hole through a connecting channel.

Preferably, a reforming catalyst retainer is disposed in the reforming catalyst plate under the reforming catalyst.

Preferably, an O-ring 540 is disposed in the reforming catalyst plate under the reforming catalyst.

Preferably, a cross-sectional area of the porous collection hole is formed smaller than that of the reforming catalyst.

Advantageous Effects

By providing a micro-channel hydrocarbon reformer according to the present invention, it is possible to utilize compact hydrogen manufacturing apparatus in a small or medium size. In particular, since a gas containing hydrogen, which does not penetrate a separation membrane, can be used as a fuel if the micro-channel hydrocarbon reformer of the present invention is applied to a hydrogen manufacturing apparatus including a hydrogen refining process combined with the separation membrane, the apparatus can be utilized as an excellent hydrogen manufacturing system with excellent efficiency.

Further, if the present system is linked with various fuel cells in which off gas containing hydrogen exists, good effects can be obtained.

In addition, in the micro-channel hydrocarbon reformer according to the present invention it is possible to enlarge the reforming capacity by the lamination of a plurality of reforming units. Therefore, the present invention may achieve a new process that overcomes a problem of taking a long time to enlarge a reforming capacity by a step-by-step scale-up of a conventional reforming apparatus.

BEST MODE

Figure 1:
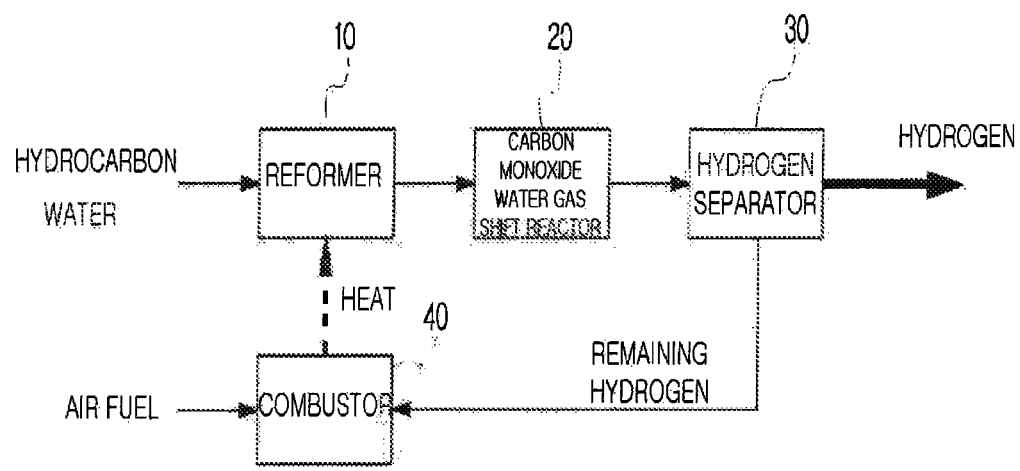
FIG. 1 is a block diagram of a hydrogen manufacturing process according to the related art.

Hereinafter, preferable embodiments of the present invention will be described with reference to the accompanying drawings. Referring to the drawings, like 2u reference characters designate like or corresponding parts throughout the several views. In the embodiments of the present invention, a detailed description of publicly known functions and configurations that are judged to be able to make the purpose of the present invention unnecessarily obscure are omitted.

Figure 2:
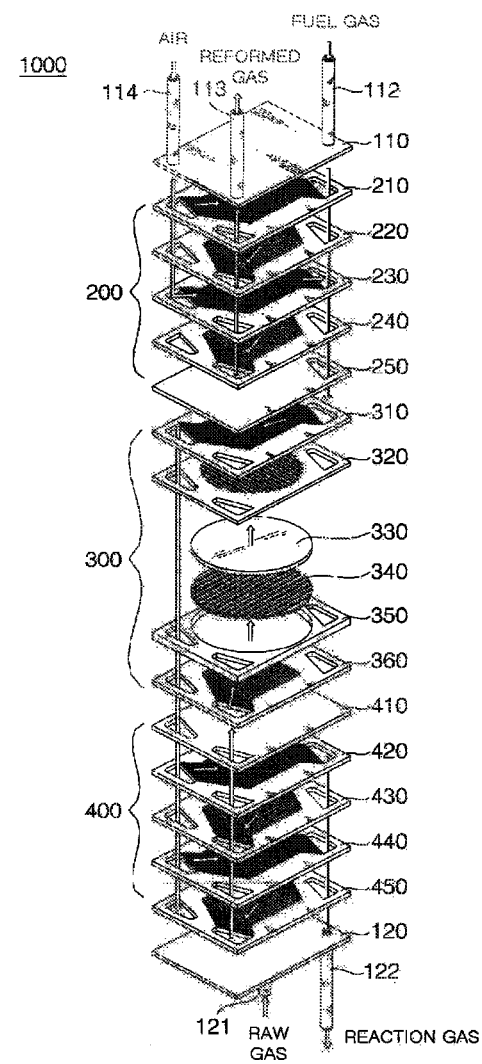
FIG. 2 is an exploded perspective view of a hydrocarbon reforming apparatus according to a first embodiment of the present invention.
Figure 7:
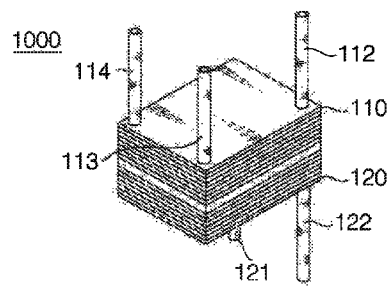
FIG. 7 is a perspective view illustrating an appearance of the hydrocarbon reforming apparatus of FIG. 2 after bonding.
Figure 8:
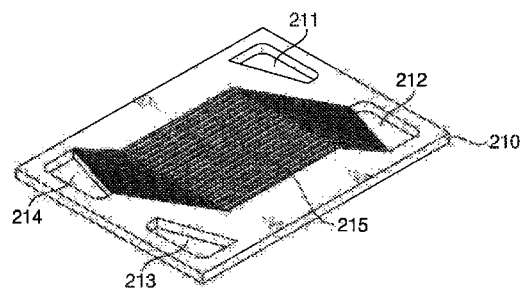
FIG. 8 is a perspective view of an upper heat transfer plate of the hydrocarbon reforming apparatus of FIG. 2.
Figure 9:
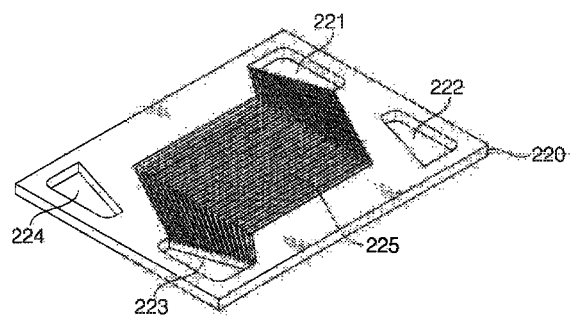
FIG. 9 is a perspective view of an upper reforming plate of the hydrocarbon reforming apparatus of FIG. 2.
Figure 10:
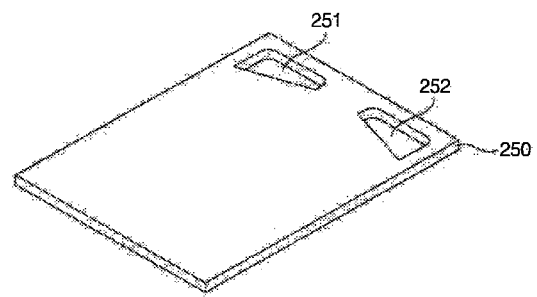
FIG. 10 is a perspective view of an upper shielding plate of the hydrocarbon reforming apparatus of FIG. 2.
Figure 11:
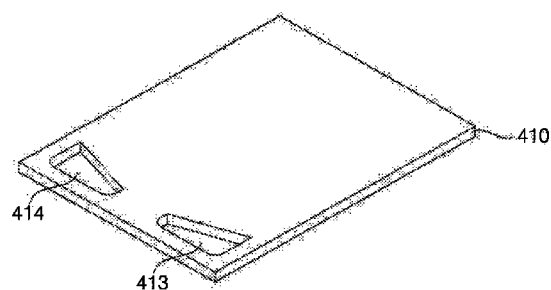
FIG. 11 is a perspective view of a lower shielding plate of the hydrocarbon reforming apparatus of FIG. 2.

As shown in FIG. 2, a hydrocarbon reforming apparatus 1000 using a micro-channel heater according to a first embodiment of the present invention includes a plurality of laminated plates which are bonded by a method of diffusion bonding, electric welding, arc welding, or the like to make a compact shape as shown in FIG. 7.

The hydrocarbon reforming apparatus 1000 includes an upper plate 110 and a lower plate 120 which are disposed at the uppermost side and the lowermost side thereof, respectively.

In addition, an upper heat transfer unit 200 which absorbs heat from an exhaust reformed gas to preheat and burn a heat transfer gas, and a reforming unit 300 in which the reforming reaction actively takes place, a lower heat transfer unit 400 which heats the reformed gas from the exhaust heat transfer gas to a temperature sufficient for the reforming reaction thereof to occur are disposed between the upper plate 110 and the lower plate 120.

Figure 16:
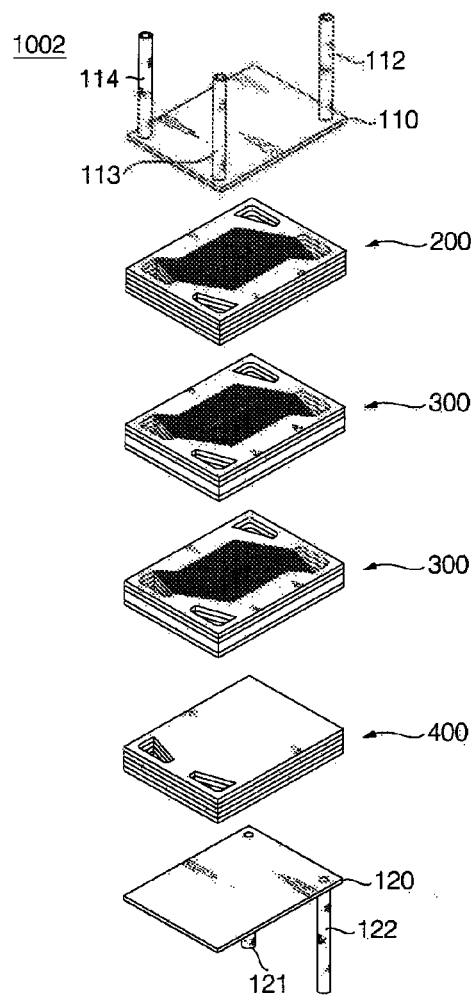
FIG. 16 is an exploded perspective view of a modified example of the hydrocarbon reforming apparatus of FIG. 2.

In particular, as shown in FIG. 16, the present invention discloses a unique structure for stacking a plurality of the reforming units 300, which will be described below.

The upper plate 110 is provided with heat transfer gas supply pipes 112 and 114 which are connected with a heat transfer gas supply source (not shown) to supply the heat transfer gases in the apparatus, and a reformed gas discharge pipe 113 for discharging the reformed gas out of the apparatus. The heat transfer gas supply pipes 112 and 114 may be a single heat transfer gas supply pipe through which both of a fuel gas and air are supplied, or separated heat transfer gas supply pipes 112 and 114 through which a fuel gas and air are separately supplied. In the first embodiment of the present invention, the fuel gas is supplied through the heat transfer gas supply pipe 112 and the air is supplied through the heat transfer gas supply pipe 114, which are placed at the same position as the heat transfer gas discharge pipe 122 which will be described below.

In addition, an ignition catalyst for igniting the introduced fuel gas may be disposed in the heat transfer gas supply pipe 112. As the ignition catalyst, it is possible to use any one which is manufactured by coating the outer surface of woven metal fiber with an oxide containing at least one of Al, Ti, Zr and Si components, and then, applying a mixture of platinum (Pt) and palladium (Pd) to a surface of the coated fiber. When the ignition catalyst is placed in the heat transfer gas supply pipe 112 and a gas containing a trace of hydrogen in a fuel is used, a process of applying an oxidation catalyst to the surface of a heat transfer channel in a heat transfer plate may be omitted.

In particular, the effect of disposing the ignition catalyst according to the present invention in the heat transfer supply pipe, that is, the effect of positioning an ignition point, leads to a result entirely different from that obtained by a configuration in that the ignition catalyst is positioned in the heat transfer gas discharge pipe 122. That is, when the ignition catalyst is positioned in the heat transfer gas discharge pipe 122, a decrease in the heat transfer area is inevitable in order to move the ignition point toward an initial mixing point of fuel and air, because the size of a single micro-channel on the surface of a plate should be at or above a certain level (quenching distance) to prevent cooling of the ignition flame. Therefore, in order to maximize heat transfer efficiency, it is preferable to position the ignition point in the heat transfer gas supply pipe such as in the present invention, or above (not shown) the heat transfer gas supply pipe, and to maintain a groove diameter of the micro-channel even smaller.

The reason why the same function can be performed regardless if whether the ignition point is positioned inside or outside the reformer is that the flame is moved naturally to the initial mixing point of fuel and air after ignition, because hydrogen is contained in the fuel.

The supporter of the ignition catalyst may be manufactured by ceramic materials in a particle, tube or bar shape. Alternatively, using a high-voltage discharge device may achieve the object of the present invention.

The lower plate 120 is provided with a raw gas supply pipe 121 which is connected with a raw gas supply source (not shown) to supply the raw gas in the apparatus, and the heat transfer gas discharge pipe 122 for discharging the heat transfer gas out of the apparatus.

The upper heat transfer unit 200 which is disposed under the upper plate 110 and includes an upper heat transfer gas flow path which is connected with the heat transfer gas supply pipes 112 and 114 to flow the heat transfer gas, and an upper reformed gas flow path which is formed in contact with the upper heat transfer gas flow path so as to allow heat transfer therebetween, and connected with the reformed gas discharge pipe 113.

The upper heat transfer unit 200 includes upper heat transfer channels 215 and 235 which are communicated with the heat transfer gas supply pipes 112 and 114, at least one upper heat transfer plates 210 and 230 which forms the upper heat transfer gas flow path, upper reforming channels 225 and 245 which are communicated with the reformed gas discharge pipe 113, and at least one upper reforming plates 220 and 240 which are alternately laminated with the upper heat transfer plates 210 and 230 to form the upper reformed gas flow path. Further, an upper shielding plate 250 is disposed at the lowermost side of the upper heat transfer unit 200.

Figure 3:
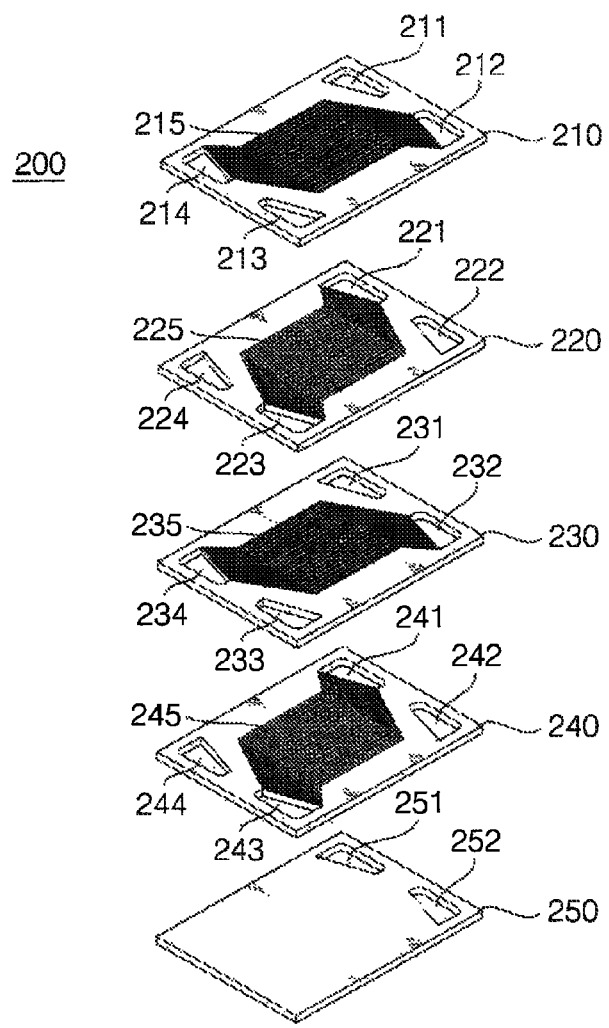
FIG. 3 is an exploded perspective view of an upper heat transfer unit of FIG. 2.

The upper heat transfer plates 210 and 230 and the upper reforming plates 220 and 240 include first to fourth upper through holes formed therein, as shown in FIG. 3. The first upper through holes 211, 221, 231 and 241, the second upper through holes 212, 222, 232 and 242, the third upper through holes 213, 223, 233 and 243, and the fourth upper through holes 214, 224, 234 and 244 are isolated from each other, and in the case that the hydrocarbon reforming apparatus 1000 has a rectangular cross section shape as shown in FIG. 2, it is preferable that these upper through holes be arranged near vertices of the rectangular structure in terms of heat transfer efficiency. Therefore, when the upper heat transfer plates 210 and 230 and the upper reforming plates 220 and 240 are laminated, the first reforming through holes to the fourth reforming through holes are arranged in the same position up and down to form a tube shape.

Accordingly, the upper heat transfer channels 215 and 235 communicate the second upper through holes 212 and 232 with the fourth upper through holes 214 and 234, while isolating the first upper through holes 211 and 231 from the third upper through holes 213 and 233. In addition, the upper reforming channels 225 and 245 communicate the first upper through holes 221 and 241 with the third upper through holes 223 and 243, while isolating the second upper through holes 222 and 242 from the fourth upper through holes 224 and 244.

The upper shielding plate 250 only includes a first upper through hole 251 and a second upper through hole 252.

As a result, the upper heat transfer gas flow path is formed by the heat transfer gas supply pipes 112 and 114, the second upper through holes 212, 222, 232 and 242, the fourth upper through holes 214, 224, 234 and 244, the upper heat transfer channels 215 and 235, and the second upper through hole 252 of the upper shielding plate 250. In addition, the upper reformed gas flow path is formed by the reformed gas discharge pipe 113, the first upper through holes 211, 221, 231 and 241, the third upper through holes 213, 223, 233 and 243, the upper reforming channels 225 and 245, and the first upper through hole 251 of the upper shielding plate 250.

The lower heat transfer unit 400 which is disposed on the lower plate 120 and includes a lower heat transfer gas flow path which is connected with the heat transfer gas discharge pipe 122 to flow the heat transfer gas, and a lower reformed gas flow path which is formed in contact with the lower heat transfer gas flow path so as to allow heat transfer therebetween, and connected with the raw gas supply pipe 121.

The lower heat transfer unit 400 includes lower heat transfer channels 425 and 445 which are communicated with the heat transfer gas discharge pipe 122, at least one lower heat transfer plates 420 and 440 which forms the lower heat transfer gas flow path, lower reforming channels 435 and 455 which are communicated with the raw gas supply pipe 121, and at least one lower reforming plates 430 and 450 which are alternately laminated with the lower heat transfer plate 420 and 440 to form the lower reformed gas flow path. Further, a lower shielding plate 410 is disposed at the uppermost side of the lower heat transfer unit 400.

Figure 6:
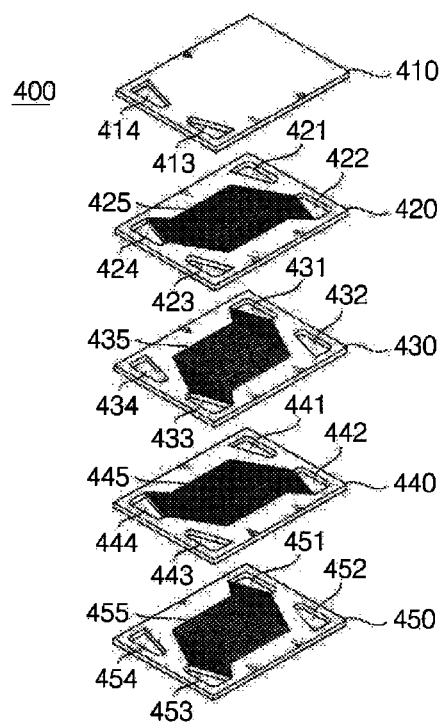
FIG. 6 is an exploded perspective view of a lower heat transfer unit of FIG. 2.

The lower heat transfer plates 420 and 440 and the lower reforming plates 430 and 450 include first to fourth lower through holes formed therein, as shown in FIG. 6. The first lower through holes 421, 431, 441 and 451, the second lower through holes 422, 432, 442 and 452, the third lower through holes 423, 433, 443 and 453, and the fourth lower through holes 424, 434, 444 and 454 are isolated from each other, and in the case that the hydrocarbon reforming apparatus 1000 has a rectangular cross section shape as shown in FIG. 6, it is preferable that these lower through holes be arranged near vertices of the rectangular structure in terms of heat transfer efficiency. Therefore, when the lower heat transfer plates 420 and 440 and the lower reforming plates 430 and 450 are laminated, the first lower through holes to the fourth lower through holes are arranged in the same position up and down to form a tube shape.

Accordingly, the lower heat transfer channels 425 and 445 communicate the second lower through holes 422 and 442 with the fourth lower through holes 424 and 444, while isolating the first lower through holes 421 and 441 from the third lower through holes 423 and 443. In addition, the lower reforming channels 435 and 455 communicate the first lower through holes 431 and 451 with the third lower through holes 433 and 453, while isolating the second lower through holes 432 and 452 from the fourth lower through holes 434 and 454.

The lower shielding plate 410 only includes a third lower through hole 413 and a fourth lower through hole 414.

As a result, the lower heat transfer gas flow path is formed by the heat transfer gas discharge pipe 122, the second lower through holes 422, 432, 442 and 452, the fourth lower through holes 424, 434, 444 and 454, the lower heat transfer channels 215 and 235, and the fourth lower through hole 414 of the lower shielding plate 410. In addition, the lower reformed gas flow path is formed by the raw gas supply pipe 121, the first lower through holes 421, 431, 441 and 451, the third lower through holes 423, 433, 443 and 453, the lower reforming channels 435 and 455, and the third lower through hole 413 of the lower shielding plate 410.

Figure 4:
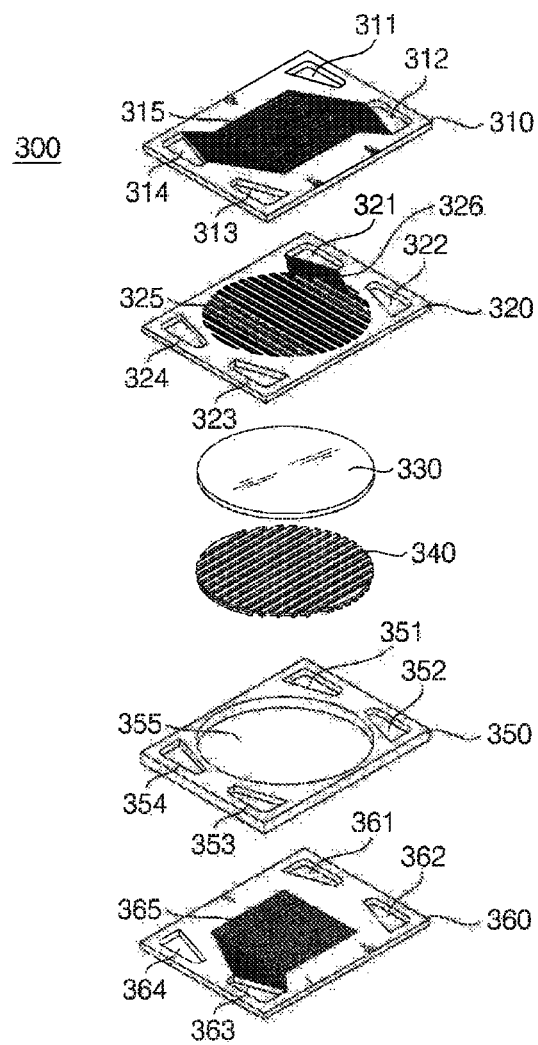
FIG. 4 is an exploded perspective view of a reforming unit of FIG. 2.
Figure 5:
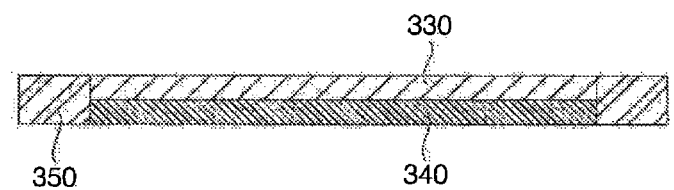
FIG. 5 is a cross sectional view of a reforming plate in which a reforming catalyst and a reforming catalyst retainer are installed of FIG. 2.

The reforming unit 300 has a structure that can be laminated in two or more layers, as shown in FIG. 4. For this, the reforming unit 300 includes a gas supply plate 360 on which a gas supply channel 365 for communicating only with the lower reformed gas flow path is installed, a reforming catalyst plate 350 which is laminated on the gas supply plate 360 and has a reforming catalyst 330 mounted thereon, a gas transfer unit which is laminated on the reforming catalyst plate 350 to transfer the gas reformed by the reforming catalyst 330 to the upper reformed gas flow path, and a heating plate 310 which is disposed under the gas supply plate 360 or on the lower gas transfer unit and has a heating channel 315 for communicating the upper heat transfer gas flow path with the lower heat transfer gas flow path.

The gas supply plate 360, the reforming catalyst plate 350, the gas transfer unit, and the heating plate 310 include first reforming through holes 311, 321, 351 and 361 communicated with the upper reformed gas flow path, second reforming through holes 312, 322, 352 and 362 communicated with the upper heat transfer gas flow path, third reforming through holes 313, 323, 353 and 363 communicated with the lower reformed gas flow path, fourth reforming through holes 314, 324, 354 and 364 communicated with the lower heat transfer gas flow path, respectively. As a result, when bonding the reforming unit 300, the first reforming through holes to the fourth reforming through holes are disposed at the same position up and down to form a tube shape.

Accordingly, all of the first to fourth reforming through holes, the first to fourth upper through holes, and the first to fourth lower through holes may be disposed at the same position up and down.

In the heating plate 310, the heating channel 315 communicates the second reforming through hole 312 and the fourth reforming through holes 314 with each other, while isolating the first reforming through hole 311 from the third reforming through holes 313.

In the gas supply plate 360, the gas supply channel 365 is communicated only with the third reforming through hole 363, while being isolated from the first reforming through hole 361, the second reforming through hole 362, and the fourth reforming through hole 364.

Figure 12:
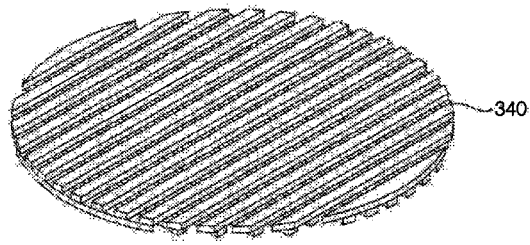
FIG. 12 is a perspective view of the reforming catalyst retainer of the hydrocarbon reforming apparatus of FIG. 2.
Figure 13:
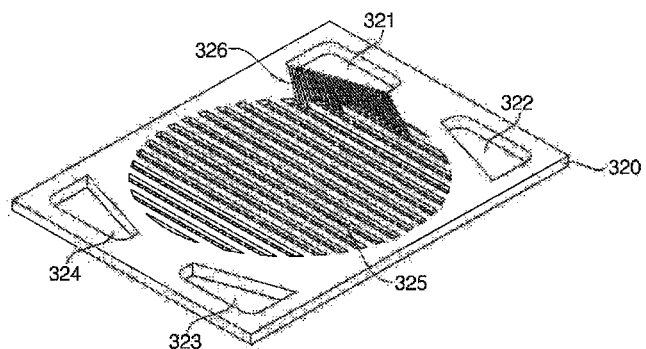
FIG. 13 is a perspective view of a collection and transfer plate of the hydrocarbon reforming apparatus of FIG. 2.
Figure 14:
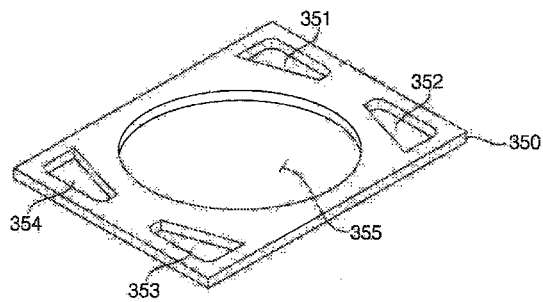
FIG. 14 is a perspective view of the reforming catalyst plate of the hydrocarbon reforming apparatus of FIG. 2.
Figure 15:
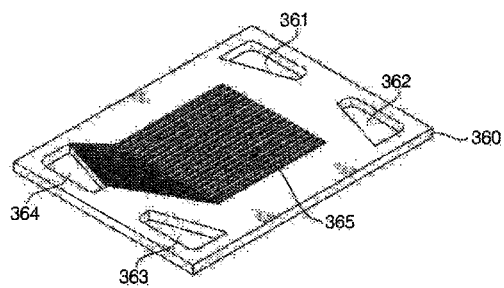
FIG. 15 is a perspective view of a gas supply plate of the hydrocarbon reforming apparatus of FIG. 2.

In addition, a reforming catalyst retainer 340 is disposed in a catalyst hole 355 formed in the center of the reforming catalyst plate 350 under the reforming catalyst 330. The reforming catalyst retainer 340 may be formed so as to have a structure in that an upper grill and a lower grill are vertically intersected with each other, as shown in FIG. 12. This reforming catalyst retainer 340 may be fabricated by adhering masks on top and bottom of a metal disc and etching the same. Preferably, the reforming catalyst retainer 340 and the reforming catalyst 330 protrude from the reforming catalyst plate 350 before bonding, and have the same height with the upper surface of the reforming catalyst plate 350 by pressing with a compression force during bonding, thereby improving the contact efficiency of the reforming catalyst 330.

It is possible to use the reforming catalyst 330 with a thickness of 0.3 to 3.0 mm which is molded by pressing nickel powder (average particle diameter of 2.0 μm) at 100 to 800 kg/cm². The molded body is sintered at 500 to 900° C. for 1 to 5 hours under an atmosphere of hydrogen gas to provide a desired strength. The reforming catalyst 330 may be varied depending on a reforming raw material. In the case of methane, diesel, or gasoline, the reforming catalyst may be fabricated using nickel powder, and when using ethanol or methanol for preparing synthesis gases, the reforming catalyst may be fabricated using micro metallic powder with copper as a main component.

In addition, the gas transfer unit includes a gas collection and transfer plate 320 which is disposed on the reforming catalyst plate 350 and has porous collection holes 325 isolated from the second to fourth reforming through holes 322, 323 and 324. The porous collection holes 325 are communicated with the first reforming hole 321 through a connecting channel 326. As described above, the porous collection holes 325 and the connecting channel 326 may be fabricated by partial etching using a mask.

It is preferable that the cross-sectional area of the porous collectin holes 325 be formed smaller than that of the reforming catalyst 330, thereby preventing reformed gas which is not passed through the reforming catalyst 330 from being flowed out.

The hydrocarbon reforming apparatus 1000 according to the first embodiment of the present invention is configured basically as described above. The hydrocarbon reforming apparatus 1000 having the above configuration may have the shape shown in FIG. 7 by bonding.

FIG. 16 shows a hydrocarbon reforming apparatus 1002 which is a modified example of the hydrocarbon reforming apparatus 1000 according to the first embodiment of the present invention and has a plurality of reforming units 300.

As described above, when bonding the reforming unit 300, the first reforming through holes to the fourth reforming through holes are disposed at the same position up and down to form a tube shape in the reforming unit 300. Accordingly, even if the reforming units 300 are laminated, it is possible to form a continuously connected tube shape. Finally, since the heat transfer gas flows only through the heating plate 310 due to the upper shielding plate 250 of the upper heat transfer unit 200 disposed on an upper side of the plurality of reforming units 300 and the lower shielding plate 410 of the lower heat transfer unit 400 disposed on a lower side of the plurality of reforming units 300, and the reformed gas flows only through the reforming catalyst 330, it is possible to laminate the reforming units 300.

Accordingly, even if the heating plate 310 is disposed at any one of the lower side of the gas supply plate 360 or the upper side of the collection and transfer plate 320, an identical effect is obtained by continuously laminating the reforming unit 300.

Figure 17:
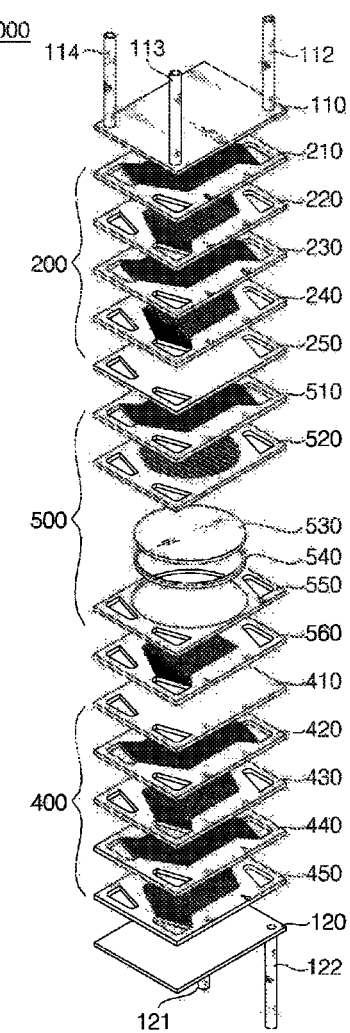
FIG. 17 is an exploded perspective view of a hydrocarbon reforming apparatus according to a second embodiment of the present invention.
Figure 18:
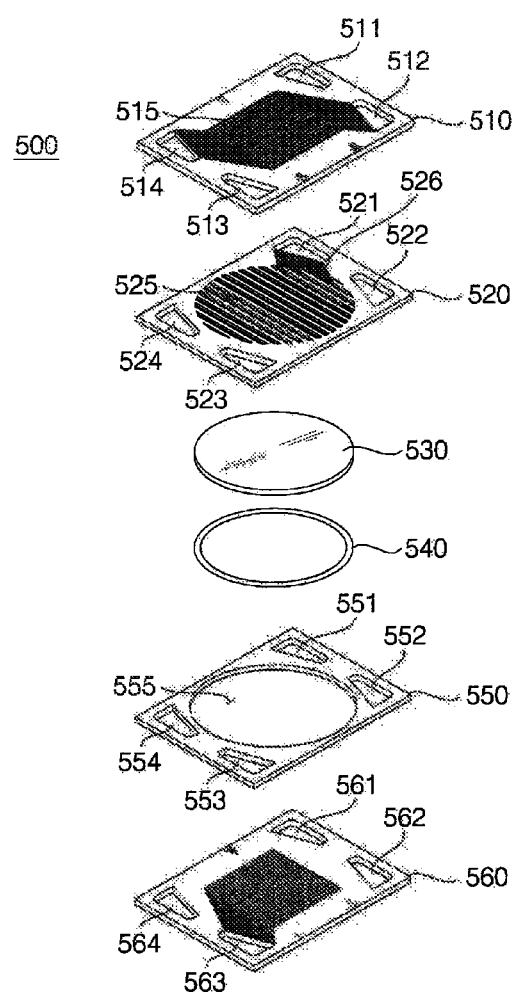
FIG. 18 is an exploded perspective view of a reforming unit of FIG. 17.
Figure 19:
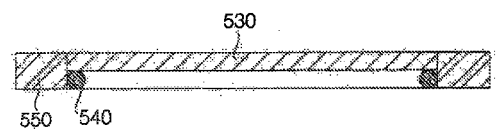
FIG. 19 is a cross sectional view of a reforming plate in which a reforming catalyst and an o-ring are installed of FIG. 17.

FIGS. 17 to 19 show a hydrocarbon reforming apparatus 2000 according to a second embodiment of the present invention. The configuration parts corresponding to the hydrocarbon reforming apparatus 1000 of the first embodiment have the same reference numbers, and a detailed description thereof will be omitted.

The hydrocarbon reforming apparatus 2000 of the second embodiment is different from the hydrocarbon reforming apparatus 1000 of the first embodiment in terms of installation form of a reforming catalyst 530. That is, in the hydrocarbon reforming apparatus 2000 of the second embodiment, an O-ring 540 is disposed under the reforming catalyst 530 to provide a pressing force for sealing the raw gas and closely contacting the reforming catalyst 530 to the lower side of a collection and transfer plate 520. The O-ring 540 is made of metallic material, and is pressed and deformed in an assembly stage of the apparatus to closely contact an inner wall of a catalyst hole 555, thereby preventing the reaction gas from being leaked between the reforming catalyst 530 and the collection and transfer plate 520. The sectional shape of the O-ring 540 is not limited, but may be formed in a circle in the second embodiment of the present invention. Accordingly, the sum of the thickness of the O-ring 540 and the reforming catalyst 530 are larger than the thickness of the catalyst hole 555 before assembly, and become the same as the thickness of the catalyst hole 555 during assembling, thus it is possible to provide a sufficient tightness due to the O-ring 540.

Figure 20:
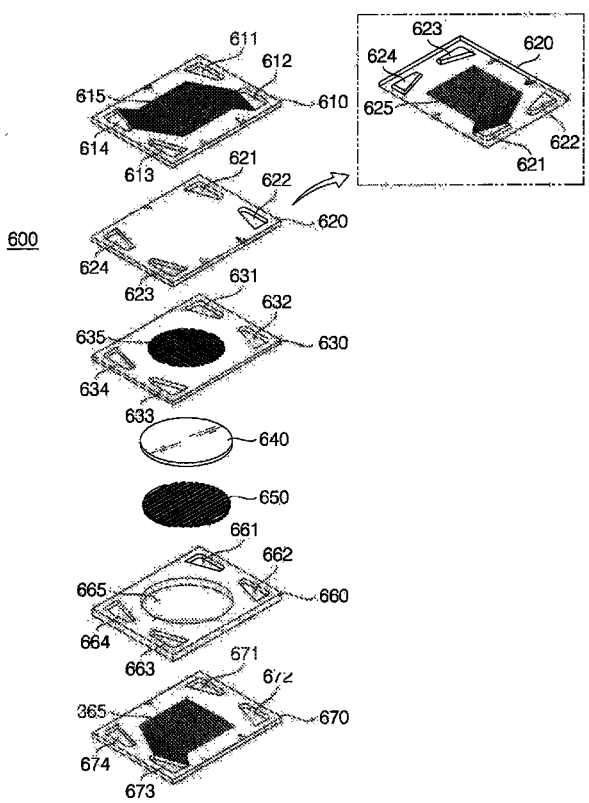
FIG. 20 is an exploded perspective view of a modified example of the reforming unit shown in FIG. 4.

FIG. 20 shows a reforming unit 600 which is a modified example of the reforming unit 300 of the hydrocarbon reforming apparatus 1000 according to the first embodiment of the present invention. The configuration parts corresponding to the hydrocarbon reforming apparatus 1000 of the first embodiment have the same reference numbers, and a detailed description thereof will be omitted.

The reforming unit 600 includes a gas collection plate 630 for providing a gas collecting function to the gas transfer unit, and a gas transfer plate 620 having a gas transferring function. These are two separated functions of the collection and transfer plate 320 of the first embodiment.

The gas collection plate 630 includes porous collection holes 635 which are formed in the center portion thereof, and isolated from first to fourth reforming through holes 631, 632, 633 and 634. In addition, the gas transfer plate 620 has an inverted shape of a gas supply plate 670 and includes a gas transfer channel 625 formed thereon. The gas transfer channel 625 is communicated only with the first reforming through hole 621, while being isolated from the second to fourth reforming through holes 622, 623 and 624. The gas transfer channel 625 has a function of collecting the reformed gas supplied from the porous collection holes 635 and transferring the same to the first reforming transfer hole 621.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

DESCRIPTION OF REFERENCE NUMERALS IN DRAWINGS

10: reformer, 20: carbon monoxide water gas shift reactor
30: hydrogen separator, 40: combustor
110: upper plate, 112, 114 heat transfer gas supply pipe
113 reformed gas discharge pipe, 120 lower plate
121: raw gas supply pipe, 122: heat transfer gas discharge pipe
200: upper heat transfer unit, 210, 230: upper heat transfer plate
211, 221, 231, 241: first upper through hole, 212, 222, 232, 242 second upper through hole
213, 223, 233, 243: third upper through hole, 214, 224, 234, 244 fourth upper through hole
215, 235: upper heat transfer channel, 220, 240: upper reforming plate
225, 245: upper reforming channel, 250: upper shielding plate
300, 500, 600: reforming unit, 310, 510, 610: heating plate
311, 321, 351, 361, 511, 521, 551, 561, 611, 621, 631, 661, 671: first reforming through hole
312, 322, 352, 362, 512, 522, 552, 562, 612, 622, 632, 662, 672: second reforming through hole
313, 323, 353, 363, 513, 523, 553, 563, 613, 623, 633, 663, 673: third reforming through hole
314, 324, 354, 364, 514, 524, 554, 564, 614, 624, 634, 664, 674: fourth reforming through hole
315, 515, 615: heating channel, 320, 520: collection and transfer plate
325, 525, 635: porous collecting holes, 326, 526: connecting channel
330, 530, 640: reforming catalyst, 340, 650: reforming catalyst retainer
350, 550, 660: reforming catalyst plate, 355, 555, 665: catalyst hole
360, 560, 670: gas supply plate, 365, 565: gas supply channel
400: lower heat transfer unit, 410: lower shielding plate
420, 440: lower heat transfer plate, 421, 431, 441, 451: first lower through hole
422, 432, 442, 452: second lower through hole, 423, 433, 443, 453: third lower through hole
424, 434, 444, 454: fourth lower through hole, 425, 445: lower heat transfer channel
430, 450 lower reforming plate, 435, 455: lower reforming channel
540: O-ring, 625: gas transfer channel
1000, 1002, 2000: hydrocarbon reforming apparatus

The invention claimed is:

1. An apparatus for hydrocarbon reforming using a microchannel heater comprising:

an upper plate including a heat transfer gas supply pipe which is connected with a heat transfer gas supply source to supply a heat transfer gas, and a reformed gas discharge pipe for discharging a reformed gas;

a lower plate including a raw gas supply pipe which is connected with a raw gas supply source to supply a raw gas, and a heat transfer gas discharge pipe for discharging the heat transfer gas;

an upper heat transfer unit which is disposed under the upper plate and includes an upper heat transfer gas flow path which is connected with the heat transfer gas supply pipe to flow the heat transfer gas, and an upper reformed gas flow path which is formed in contact with the upper heat transfer gas flow path so as to allow heat transfer therebetween, and connected with the reformed gas discharge pipe;

a lower heat transfer unit which is disposed on the lower plate and includes a lower heat transfer gas flow path which is connected with the heat transfer gas discharge pipe to flow the heat transfer gas, and a lower reformed gas flow path which is formed in contact with the lower heat transfer gas flow path so as to allow heat transfer therebetween, and connected with the raw gas supply pipe; and at least one reforming unit laminated between the upper heat transfer unit and the lower heat transfer unit, wherein the reforming unit, in order to be laminated in two or more layers, includes:

a gas supply plate on which a gas supply channel for communicating only with the lower reformed gas flow path is installed;

a reforming catalyst plate which is laminated on the gas supply plate and has a reforming catalyst mounted thereon;

a gas transfer unit which is laminated on the reforming catalyst plate to transfer the reformed gas by the reforming catalyst to the upper reformed gas flow path; and a heating plate which is disposed under the gas supply plate or on the gas transfer unit and has a heating channel for communicating the upper heat transfer gas flow path with the lower heat transfer gas flow path, and wherein the gas supply plate, the reforming catalyst plate, the gas transfer unit, and the heating plate include first reforming through holes communicated with the upper reformed gas flow path, second reforming through holes communicated with the upper heat transfer gas flow path, third reforming through holes communicated with the lower reformed gas flow path, and fourth reforming through holes communicated with the lower heat transfer gas flow path, respectively.

2. The apparatus according to claim 1, wherein the upper heat transfer unit comprises:
- at least one upper heat transfer plate which has an upper heat transfer channel communicated with the heat transfer gas supply pipe, and form the upper heat transfer gas flow path; and
- at least one upper reforming plate which has an upper reforming channel communicated with the reformed gas discharge pipe, and is alternately laminated with the upper heat transfer plate to form the upper reformed gas flow path,
- the upper heat transfer plate and the upper reforming plate include first to fourth upper through holes formed at a position corresponding to the first to fourth reforming through holes of the reforming unit, and
- an upper shielding plate having the first and second upper through holes formed therein and being disposed at the lowermost side of the upper heat transfer unit.

3. The apparatus according to claim 1, wherein the lower heat transfer unit comprises:
- at least one lower heat transfer plate which has a lower heat transfer channel communicated with the heat transfer gas supply pipe, and form the lower heat transfer gas flow path; and
- at least one lower reforming plate which has a lower reforming channel communicated with the raw gas supply pipe, and is alternately laminated with the lower heat transfer plate to form the lower reformed gas flow path,
- the lower heat transfer plate and the lower reforming plate include first to fourth lower through holes formed at a position corresponding to the first to fourth reforming through holes of the reforming unit, and
- a lower shielding plate having the third and fourth lower through holes formed therein and being disposed at the uppermost side of the lower heat transfer unit.

4. The apparatus according to claim 1, wherein the gas transfer unit comprises:
- a gas collection plate which is disposed on the reforming catalyst plate, and isolated from the first to fourth reforming through holes; and
- a gas transfer plate which is disposed on the gas collection plate, and includes a gas transfer channel communicated only with the first reforming through hole.

5. The apparatus according to claim 1, wherein the gas transfer unit is a collection and transfer plate which is disposed on the reforming catalyst plate, and has porous collection holes isolated from the second to fourth reforming through holes, wherein the porous collection holes are communicated with the first reforming hole through a connecting channel.

6. The apparatus according to claim 1, wherein a reforming catalyst retainer is disposed in the reforming catalyst plate under the reforming catalyst.

7. The apparatus according to claim 1, wherein an O-ring is disposed in the reforming catalyst plate under the reforming catalyst.

8. The apparatus according to claim 5, wherein a cross-sectional area of the porous collection hole is formed smaller than that of the reforming catalyst.

* * * * *